(12) United States Patent
Holma et al.

(10) Patent No.: US 11,224,097 B2
(45) Date of Patent: Jan. 11, 2022

(54) SCALABLE MOBILE NETWORK

(71) Applicant: Nokia Solutions and Networks Oy, Espoo (FI)

(72) Inventors: Maunu Elias Holma, Helsinki (FI); Tomi Mikael Vahtera, Vantaa (FI); Juha Ilmari Hartikainen, Tampere (FI)

(73) Assignee: Nokia Solutions and Networks Oy, Espoo (FI)

( * ) Notice: Subject to any disclaimer, the term of this patent is extended or adjusted under 35 U.S.C. 154(b) by 42 days.

(21) Appl. No.: 16/467,274

(22) PCT Filed: Dec. 6, 2016

(86) PCT No.: PCT/EP2016/079925
§ 371 (c)(1),
(2) Date: Jun. 6, 2019

(87) PCT Pub. No.: WO2018/103826
PCT Pub. Date: Jun. 14, 2018

(65) Prior Publication Data
US 2020/0084836 A1    Mar. 12, 2020

(51) Int. Cl.
*H04L 12/46*    (2006.01)
*G06F 9/455*    (2018.01)
*H04W 88/16*    (2009.01)
*H04L 12/24*    (2006.01)
*H04W 8/08*    (2009.01)

(52) U.S. Cl.
CPC ......... *H04W 88/16* (2013.01); *H04L 12/4641* (2013.01); *H04L 41/0893* (2013.01); *H04L 41/12* (2013.01); *H04W 8/082* (2013.01); *G06F 2009/45595* (2013.01)

(58) Field of Classification Search
None
See application file for complete search history.

(56) References Cited

U.S. PATENT DOCUMENTS 9,729,396 B2 *   8/2017  Rosa de Sousa Teixeira ............
                                                           H04W 84/042
9,781,016 B1 *  10/2017  Marquardt .............. H04L 45/56
2014/0201374 A1   7/2014  Ashwood-Smith et al.
(Continued)

OTHER PUBLICATIONS

Office Action dated Mar. 24, 2020 for Korean Patent Application No. 10-2019-7019454, 9 pages.
(Continued)

*Primary Examiner* — Ajit Patel
(74) *Attorney, Agent, or Firm* — Tong, Rea, Bentley & Kim, LLC (57) ABSTRACT

A method and an arrangement in a mobile communication network infrastructure are provided. The solution comprises implementing (300) core network and radio access network parts of the mobile communication network utilising a single layer of virtualized network function (VNF) components, where a given VNF component is designated to serve a given user equipment. At least part of traffic directed to given user equipment is routed (302) through a routing arrangement comprising a set of routers to the VNF component serving the user equipment. When the VNF component serving the user equipment is changed, the routing arrangement is updated (304) with the change.

14 Claims, 3 Drawing Sheets

(56) References Cited

U.S. PATENT DOCUMENTS

| | | |
|---|---|---|
| 2014/0362790 A1 | 12/2014 | McCann |
| 2015/0110008 A1 | 4/2015 | Puthenpura et al. |
| 2016/0057234 A1* | 2/2016 | Parikh .................... H04L 67/16 |
| | | 709/226 |
| 2016/0112269 A1* | 4/2016 | Singh ................... H04L 43/065 |
| | | 709/224 |
| 2016/0119417 A1* | 4/2016 | Fang .................. H04L 67/1095 |
| | | 709/219 |
| 2016/0344628 A1 | 11/2016 | Hocker et al. |
| 2017/0086049 A1* | 3/2017 | Vrzic .................... H04W 40/00 |
| 2017/0086111 A1* | 3/2017 | Vrzic .................... H04W 36/32 |
| 2017/0142206 A1* | 5/2017 | Kodaypak ............... H04L 67/10 |
| 2017/0170990 A1* | 6/2017 | Gaddehosur ........ H04L 67/1031 |
| 2017/0202005 A1* | 7/2017 | Madan ............... H04W 72/1231 |
| 2017/0279668 A1* | 9/2017 | Shevenell ........... H04L 41/0677 |
| 2018/0152877 A1* | 5/2018 | Van Lieshout ......... H04L 45/74 |
| 2019/0129745 A1* | 5/2019 | Wang .................. H04L 41/0806 |

OTHER PUBLICATIONS

Nokia, "Nokia Shared Data Layer simplifies telco networks and prepares them for IoT and 5G #MWC16," Nokia Communications, downloaded from https://www.nokia.com/about-US/news/releases/2016/02/18/nokia-shared-data-layer-simplifies-telco-networks-and-prepares-them-for-iot-and-5g-mwcl6/, Feb. 18, 2016, 4 pages.

* cited by examiner

SCALABLE MOBILE NETWORK

CROSS-REFERENCE TO RELATED APPLICATIONS

The presentation application claims priority to PCT Application Serial No. PCT/EP2016/079925, entitled "SCALABLE MOBILE NETWORK" and filed on Dec. 6, 2016, the entirety of which is incorporated by reference herein.

TECHNICAL FIELD

The exemplary and non-limiting embodiments of the invention relate generally to communications. Embodiments of the invention relate especially to cloud based networking applications.

BACKGROUND

In a wireless network, resource allocation may play a critical part in providing functionality for user devices. One way to reduce limitations of physical hardware may be to provide virtualized network functions which may utilize resources from one or more physical entities of the wireless networks. The physical entities may be located in a cloud network. The availability of multicore processors and smart routing are some of the technical features which make cloud based networking possible.

In order to achieve the benefits of cloud based networking, legacy software based networking product designs as a physical network function (PNF) may be converted to a virtualized network function (VNF) which are realised using cloud based computing as virtual resources (VM).

Mobile networking may be roughly divided into user equipment (UE) functions, such as charging, mobility, call management, UE radio control, and cell functions, such as location area management and cell radio control. Mobile networks must typically scale to a big number of UEs and cells. Thus, the realisation of cloud based networking requires a large number of processors.

Mobility of UEs present challenges to design of network architecture. As UEs move the cloud based networking must support the mobility.

BRIEF DESCRIPTION

According to an aspect of the present invention, there are provided a method according to claims 1 and 9.

According to an aspect of the present invention, there are provided arrangements according to claims 10 and 15.

One or more examples of implementations are set forth in more detail in the accompanying drawings and the description below. Other features will be apparent from the description and drawings, and from the claims.

BRIEF DESCRIPTION OF THE DRAWINGS

In the following the invention will be described in greater detail by means of preferred embodiments with reference to the accompanying drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in any Information technology (IT) system supporting required functionalities. In following, as an example, embodiments of the invention are described in connection with a radio system, such as in at least one of the following: Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), and/or LTE-Advanced.

The embodiments are not, however, restricted to the system given as an example but a person skilled in the art may apply the solution to other systems provided with necessary properties. Another example of a suitable communications system is the 5G concept. 5G is likely to use multiple input-multiple output (MIMO) techniques (including MIMO antennas), many more base stations or nodes than the LTE (a so-called small cell concept), including macro sites operating in cooperation with smaller stations and perhaps also employing a variety of radio technologies for better coverage and enhanced data rates. 5G will likely be comprised of more than one radio access technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also it may be integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave).

One of the concepts considered to be used in 5G networks is network slicing in which multiple independent and dedicated virtual sub-networks (network instances) may be created within the same infrastructure to run services that have different requirements on latency, reliability, throughput and mobility. It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware.

Cloud computing or cloud data storage has been focus of many recent studies. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE. Some of the functions of the LTE may even be nonexistent in the 5G system. Some other technology advancements probably to be used are Software-Defined Networking (SDN), Big Data, and all-IP, which may change the way networks are being constructed and managed.

Figure 1:
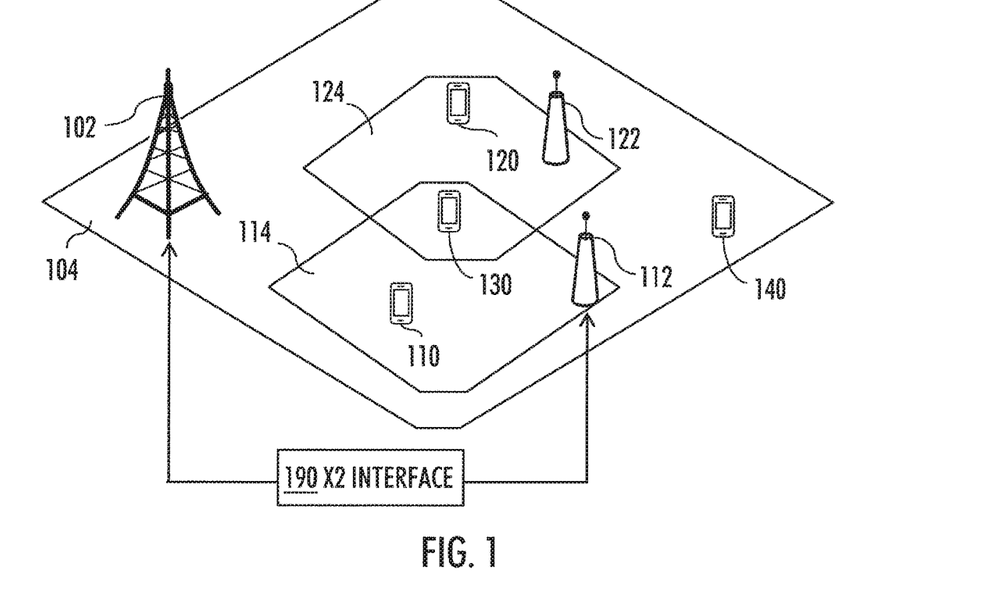
FIG. 1 illustrates an example wireless communication system to which embodiments of the invention may be applied.

FIG. 1 illustrates example of a radio system (also referred to as a cellular communication system or cellular system) to which embodiments of the invention may be applied. Radio communication networks or wireless communication networks, such as the Wireless Local Area Network (WLAN, or WiFi) the Long Term Evolution (LTE), the LTE-Advanced (LTE-A) of the 3rd Generation Partnership Project (3GPP), or the predicted future 5G solutions, are typically composed of at least one network element, such as a network element 102, providing a cell 104. In the example of FIG. 1, cells 104, 114, 124 may be shown. The cell 114 may be provided by a network element 112, and the cell 124 may be provided by a network element 122, for example. The cell 104 may be provided by the network element 102. It is, however, possible that a network element of the radio system may provide more than one cell. Thus, for example, the network element 102 may provide the cell 104, the cell 114, and/or the cell 124. In general, the system may comprise one or more network elements (similar to those described with reference to FIG. 1), wherein each network element provides one or more cells providing service to one or more terminal devices in the cells.

Each cell of the radio communication network may be, e.g., a macro cell, a micro cell, a femto, or a pico-cell, for example, meaning that there may be one or more of each of the described cells. Each network element of the radio communication network, such as the network elements 102, 112, 122, may be an evolved Node B (eNB) as in the LTE and LTE-A, a radio network controller (RNC) as in the UMTS, a base station controller (BSC) as in the GSM/GERAN, Access Point (AP), or any other apparatus capable of controlling radio communication and managing radio resources within a cell. That is, there may be one or more of each of the described apparatuses or entities. To give couple of examples, the network element 102 may be an eNB, for example. The network element 112 may also be an eNB. For example, network element 102 may provide a macro cell and the network element 112 may provide a micro cell.

For 5G solutions, the implementation may be similar to LTE-A, as described above. The network elements 102, 112, 122 may be base station(s) or a small base station(s), for example. In the case of multiple eNBs in the communication network, the eNBs may be connected to each other with an X2 interface 190 as specified in the LTE. Example of this may be shown in FIG. 1, wherein the network element 112 may be shown to be connected to the network element 102 via the X2 interface 190. Other communication methods between the network elements may also be possible. For example, APs of WLAN system may communicate with each other. At least some of the network elements 102, 112, 122 may be further connected via an S1 interface to an evolved packet core, more specifically to a mobility management entity (MME) and to a system architecture evolution gateway (SAE-GW). So in general, the network elements of FIG. 1 may be communicatively connected (wireless and/or wired) to each other using one or more circuitries. The X2 interface 190 is one example of how to realize such communication.

The cells 114, 124 may also be referred to as sub-cells or local area cells, for example. The network elements 112, 122 may be referred to as sub-network elements or local area access nodes, for example. The cell 104 may be referred also to as a macro cell, for example. The network element 102 may be referred to as a macro network element, for example. In an embodiment, the local area access nodes are network elements similar to the network element 102. Thus, for example, the local area access node 112 may be an eNB or a macro eNB.

The cells 104, 114, 124 may provide service for at least one terminal device 110, 120, 130, 140, wherein the at least one terminal device 110, 120, 130, 140 may be located within or comprised in at least one of the cells 104, 114, 124. The at least one terminal device 110, 120, 130, 140 may communicate with the network elements 102, 112, 122 using communication link(s), which may be understood as communication link(s) for end-to-end communication, wherein source device transmits data to the destination device. It needs to be understood that the cells 104, 114, 124 may provide service for a certain area, and thus the at least one terminal device 110, 120, 130, 140 may need to be within said area in order to be able to use said service (horizontally and/or vertically). For example, a third terminal device 130 may be able to use service provided by the cells 104, 114, 124. On the other hand, fourth terminal device 140 may be able to use only service of the cell 104, for example.

The cells 104, 114, 124 may be at least partially overlapping with each other. Thus, the at least one terminal device 110, 120, 130, 140 may be enable to use service of more than one cell at a time. For example, the sub-cells 114, 124 may be small cells that are associated with the macro cell 104. This may mean that the network element 102 (e.g. macro network element 102) may at least partially control the network elements 112, 122 (e.g. local area access nodes). For example, the macro network element 102 may cause the local area access nodes 112, 122 to transmit data to the at least one terminal device 110, 120, 130, 140. It may also be possible to receive data, by the network element 102, from the at least one terminal device 110, 120, 130, 140 via the network elements 112, 122. To further explain the scenario, the cells 114, 124 may be at least partially within the cell 104.

In an embodiment, the at least one terminal device 110, 120, 130, 140 is able to communicate with other similar devices via the network element 102 and/or the local area access nodes 112, 122. For example, a first terminal device 110 may transmit data via the network element 102 to a third terminal device 130. The other devices may be within the cell 104 and/or may be within other cells provided by other network elements. The at least one terminal device 110, 120, 130, 140 may be stationary or on the move.

The at least one terminal device 110, 120, 130, 140 may comprise mobile phones, smart phones, tablet computers, laptops and other devices used for user communication with the radio communication network. These devices may provide further functionality compared to the MTC schema, such as communication link for voice, video and/or data transfer. However, it needs to be understood that the at least one terminal device 110, 120, 130, 140 may also comprise Machine Type Communication (MTC) capable devices, such as sensor devices, e.g. providing position, acceleration and/or temperature information to name a few examples.

Figure 2:
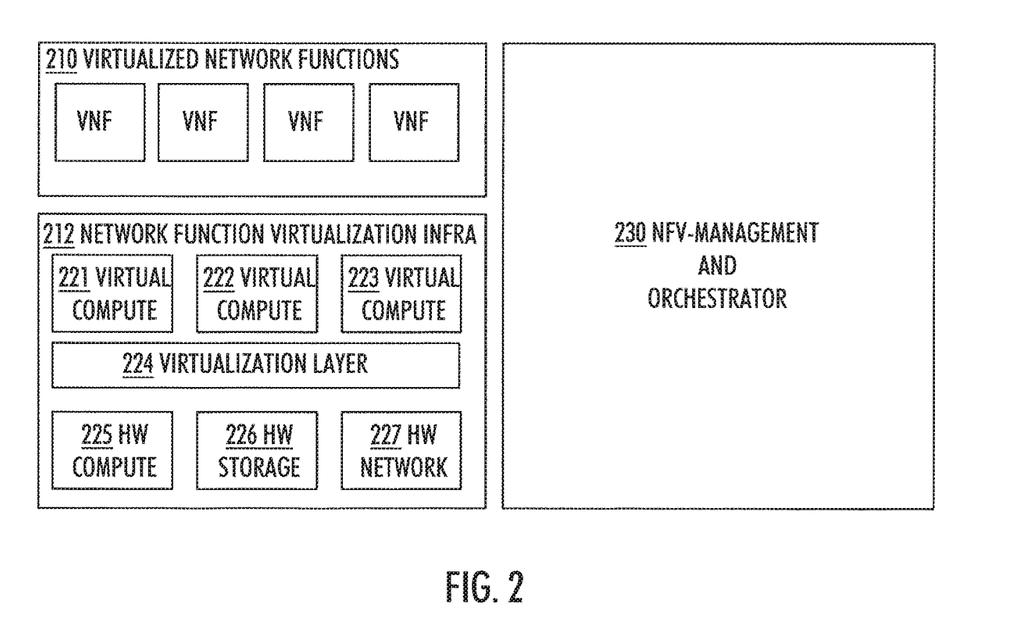
FIG. 2 illustrates an example of virtualized network functions to which embodiments of the invention may be applied.

The radio system of FIG. 1 may be configured to provide one or more VNFs 210 as shown in the example of FIG. 2. This may mean that at least some of the functions provided by the radio system are virtualized. It may be that some functions are provided directly by physical entities and some are virtualized or that all network functions are virtualized. Examples of VNFs may comprise a firewall function, anti-virus function, video optimizer function, parental control function, router function, Internet Protocol Security (IPS), Radio Network Controller (RNC), or Evolved Packet Core (EPC), to name only a few examples. In general, if for example a router function is normally provided by physical entity, it may be virtualized and thus the router function may become a VNF, i.e. router VNF.

Referring to FIG. 2, the virtualization may work such that physical hardware resources 225-227 comprising one or more hardware computing entities (e.g. processors, servers), one or more hardware storages (e.g. databases) and one or more hardware network resources (e.g. radio interfaces, wiring) are virtualized via virtualization layer 224. The virtualization layer 224 may be responsible of abstracting the physical resources provided by the hardware layer 225-227 into virtual resources 221-223. The VNFs 210 may utilize the virtual resources 221-223 to provide needed functionalities. Virtualization provides benefits, for example, as the virtual resources 221-223 may be scaled using the hardware resources 225-227. For example, more hardware resources may be dynamically allocated for the virtual entities if a need arises. Similarly, hardware resources may be used for some other purpose when, for example, network load is lower.

The virtualization of network functions may also utilize a specific NFV management and orchestration entity 230 that may be responsible for controlling the VNFs 210. For example, the NFV management and orchestration entity 230 may create VNFs or control how different VNFs work. Further the NFV management and orchestration entity 230 may control the virtualization of the hardware resources 225-227 into the virtual resources 221-223 via the virtualization layer 224.

A virtualized network function VNF is typically realised using virtualized network function components (VNFC). A virtualized network function component is a software component performing a given task. A VNF may comprise a varying number of components depending on the load of the VNF.

Thus, in cloud based networking majority of network functions are realised with virtualized infrastructure comprising sites or clusters of computing resources which may physically be divided into different locations and have different Internet Protocol (IP) addresses. Thus for example, VNFCs may be implemented using different computing resources.

For optimal performance in cloud based networking, a mobile network should have minimal number of cloud hops—i.e. minimal number of control plane and user plane hops between sites or cloud clusters to minimise delays and costs. In other words, mobile network should have flat deployment in cloud.

On the other hand, while the number of cloud hops should be minimised, the mobility of the user equipment must be supported. As UEs move, the UE function must sometimes be relocated from a server running the function to another server for performance reasons, i.e. to keep the UE function of certain UE near to the cell function of the UE. Relocations can be frequent, due to the flat deployment, so that UE might be relocated after it has passed through a few cells. The relocations should be hidden from the internet and fixed network.

There are various ways to implement mobile network architecture in cloud based networking.

First, a conventional network architecture consists of core network (CN) and radio access network (RAN) VNFs based on a 3GPP standard. It is scalable, but it has three cloud hops i.e. 3 layers: the core network layer, the radio access network controller layer and the base station layer. In a standard 4G system, the controller layer is missing. However, a cloud eNodeB will be split to cloud base station and radio access points, where the cloud base station can be actually regarded as a controller.

Second, an All-in-1 network architecture consists of one compact VNF that implements all functions of core network and radio access network. It has only one cloud hop, but it is not very scalable because it is limited one VNF.

The proposed solution, which may be denoted as a scalable all-in-1 architecture, may consist of one single scalable layer of VNFCs in a cloud and implementing all functions of core network and radio access network. Below is described how this architecture is scalable and needs only one cloud hop.

Scalability, or the capability if the network to process a large number of user equipment, is difficult to implement if the number of hops is to be kept as small as possible. Mobility of the user equipment present challenges.

First, when the UEs move from a cell group to another, the UE function should be relocated from a VNFC to another to avoid a cloud hop (or big intra-cloud hop) between the UE and cell functions.

Second, traffic to the UE should be routed directly to the correct location in cloud (preferably the correct server, but at least the correct rack of cluster) and it should be rerouted when the UE function relocates, so that an extra cloud hop (or big intra-cloud hop) may be avoided to reach the correct location. This holds especially for packet switched user plane traffic, but it is useful also for packet switched control plane and circuit switched user plane and control plane.

The traffic may come from Internet and fixed network (CS traffic from another PLMN or PSTN), for example.

Figure 3:
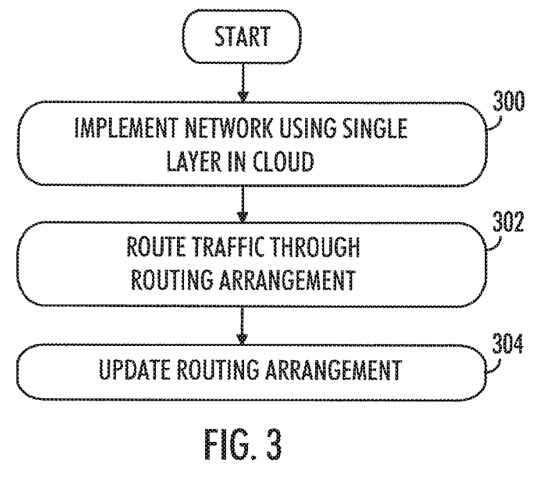
FIG. 3 is a flowchart illustrating an example of an embodiment.
Figure 4:
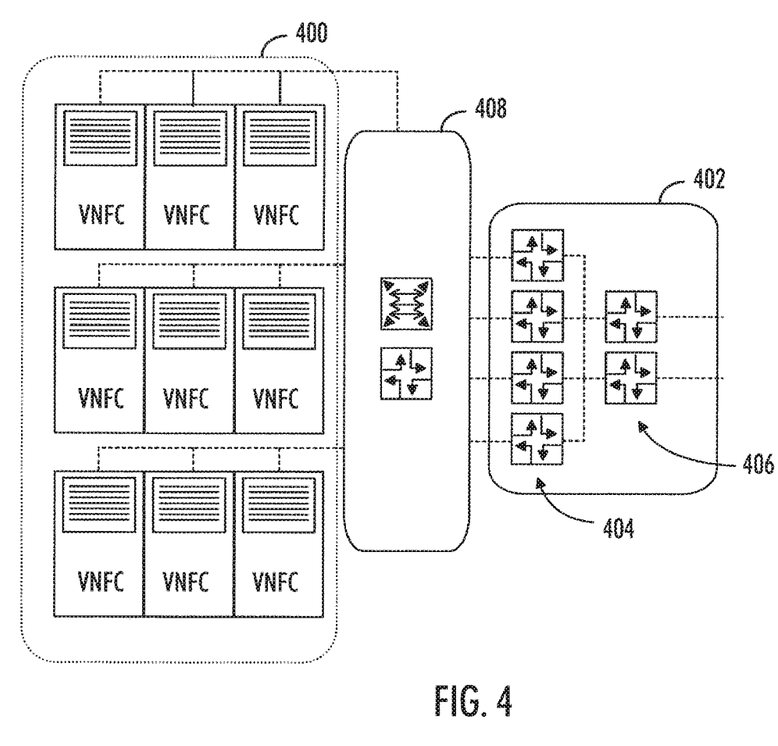
FIG. 4 illustrates an example of a scalable cloud implementation of a mobile communication network infrastructure.

FIG. 3 is a flowchart illustrating an example of an embodiment applied to a mobile communication network infrastructure of FIG. 4.

In step 300, the core network and radio access network parts of the mobile communication network are implemented in the cloud utilising a single layer of virtualized network function components 400. Thus, all VNFCs are on the same layer regardless whether they perform functions of core network or radio access network. For each given user equipment there exists a given virtualized network function component which is designated to serve the UE. The given VNFC may be denoted as master VNFC of the UE. There may be additional or optional sub-function VNFCs serving the UE. The number of cloud hops is minimal, i.e one.

In step 302, at least part of traffic directed to given user equipment is routed through a routing arrangement 402 to the virtualized network function component serving the UE. The routing arrangement 402 comprises a set of routers 404, 406.

The traffic which is routed through the routing arrangement 402 may come from Internet and fixed network (CS traffic from another PLMN or PSTN), for example. In an embodiment, traffic may come from base station or radio access point.

In step 304, when the virtualized network function component serving the UE is changed, the routing arrangement 402 is updated with the change. In an embodiment, every time when UE relocates due to mobility and the master VNFC is changed from old master VNFC to a new master VNFC, the old master VNFC may be configured to reconfigure the routing arrangement with information on the new master VNFC. Thus the routing arrangement may route the traffic to the correct VNFC without increase in the number of cloud hops.

In an embodiment, the routing arrangement 402 is configured to forward control plane and user plane data packets from internet or from fixed network to correct master VNFC of each UE. This way the cloud implementation may be realised as a one-hop implementation. In an embodiment, it is possible to apply different architecture (such as a two hop architecture) for some traffic (control plane packets, for example) and the proposed one hop architecture for some traffic (user plane packets, for example). For example, one possibility is to apply the proposed one hop architecture to packet switched traffic only, while a two hop architecture could be used for circuit-switched traffic. Another option is to apply the proposed one hop solution to packet switched user plane only.

In an embodiment, the traffic directed to given user equipment comprises a logical address @L, and the routing arrangement is configured to map the logical address @L to a physical address @P of the virtualized network function component serving the user equipment. For example, the logical address @L may be the logical IP address assigned to the UE at mobile network registration, or the IMSI (International Mobile Subscriber Identity), or the phone number of the UE.

As an example of @L in case of circuit switched user plane, we may consider that circuit switched control plane signalling negotiates termination points (IP address and port) for each call, and thus user plane packets do not carry UE identifier explicitly. In this case, the destination IP address and port can be regarded as the L@, and based on those the routing arrangement 402 can tunnel the packet to correct master VNFC. When the UE moves, the tunnel is switched to another master VNFC. In this way, the PSTN need not know anything about the mobility of the UE. Paging is not needed because the routing arrangement 402 always knows the correct master VNFC of each UE.

In an embodiment, the routing arrangement is implemented with two layers of routers, main routers 404 and hash routers 406. The first layer of routers, the hash routers 406 direct traffic to a given main router of the second layer 404 based on a given hash algorithm of the logical address of the traffic. Thus, each main router 404 may handle certain hash-based subset of L@ values. In this way, the L@→P@ tables remain small. Thus only a few UE main routers will be suitable for each UE. Each hash router 406 is configured to forward packets to a suitable main router, based on L@ hash. The main routers 404 are configured to rout the traffic to a given virtualized network function component.

The hash algorithm or function may be selected in different ways. For example, assuming that @L values are evenly distributed within a given value range, a simple hash function h=@L mod n, may be used, where h is hash value, used as the index of the main router and n equals the number of main routers When UE moves from one location to another so that its context must be moved from one master VNFC to another, the old master VNFC may be configured to update the L@→P@ mapping in all the suitable UE main routers (i.e. in all UE main routers that are suitable for the UE by L@ hash).

The number of routers in the routing arrangement 402 may vary. The hash routers 406 may be added and removed freely. The main routers 404 may also be added and removed freely. However, if the number of suitable routers per UE becomes large, it may be useful to modify the hash rule of the UE so that the number of suitable routers per UE remains reasonable. In this way, the effort of updating the L@→P@ mappings remains reasonable.

There may be a set of routers and/or switches 408 between the routing arrangement 402 and the virtualized network function components 400. However, they may be realised as in prior art.

The Master VNFCs of the UES may be configured to communicate with each other directly rather than via the routing arrangement.

In an embodiment, if need, there may be sub-function VNFCs which are used by the master VNFCs. There are different possibilities for realising VNFC arrangement. For example, there may be only master VNFCs. In another system there may be master VNFCs, core network VNFC(s) and radio network VNFC(s). Further, in an embodiment there may be master VNFC(s), control plane VNFC(s) and user plane VNFC(s). In an embodiment, there may be master VNFC(s), and separate VNFCs for different network components such as Mobile Switching Centre Server MSS, Media Gateway MGW, Mobility Management Entity MME, Gateway GW, Base Station Controller BSC, Radio Network Controller RNC and cloud base station BTS. In an embodiment, the master and sub-function VNFCs may be deployed with affinity.

The single layer implementation may be regarded as one network without any internal network boundaries.

Figure 5:
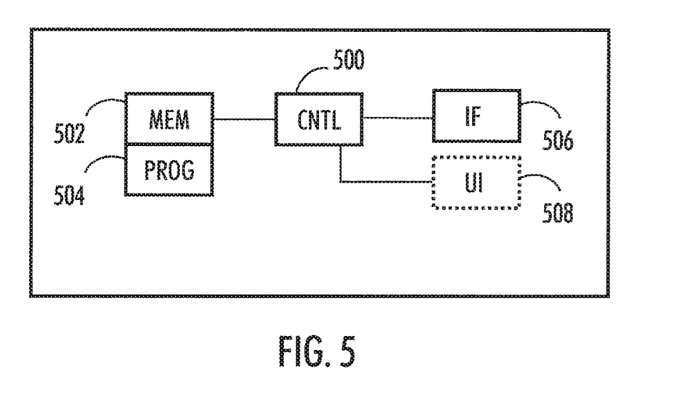
FIG. 5 illustrates an example of an apparatus of an embodiment.

FIG. 5 illustrates an example of an apparatus of an embodiment. The apparatus may be a router of the routing arrangement. The apparatus may be a main router 404 or a hash router 406.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities. The apparatus may be a combination of more than one similar or partly similar apparatuses described here.

The apparatus of the example includes a control circuitry 500 configured to control at least part of the operation of the apparatus.

The apparatus may comprise a memory 502 for storing data. Furthermore the memory may store software 504 executable by the control circuitry 500. The memory may be integrated in the control circuitry.

The software 504 may comprise a computer program comprising program code means adapted to cause the control circuitry 500 of the apparatus to perform the embodiments described above.

In an embodiment, the apparatus may further comprise an interface circuitry 506 configured to connect the apparatus to other devices. The interface may provide a wired or wireless connection with other devices.

In the case of a hash router 406, the interface may be configured to receive traffic directed to given user equipment from Internet and public switched telephone network, for example. The traffic may comprise a logical address @L. The controller 500 may be configured to apply a given hash algorithm to the logical address and control the interface to transmit the traffic to a given main router on the basis of the result of the hash algorithm.

In the case of a main router 404, the interface may be configured to receive traffic directed to given user equipment from a hash router. The controller 500 may be configured to determine on the basis of the logical address a physical address of a VNF component serving the user equipment determine and transmit the traffic to the VNF component.

In an embodiment, the apparatus may further comprise user interface 508 operationally connected to the control circuitry 500. The user interface may comprise a display, a keyboard or keypad, and a speaker, for example.

In an embodiment, the apparatus of FIG. 5 may be running VNF components. In other words, the control circuitry 500, with the memory 502 comprising a computer program code 504, may be configured to run VNF component instances. The VNF components may receive traffic from the main routers via interface 506. The VNF components may communicate with each other and with VNF components running in a different control circuitry via the interface 506.

As the VNF component serving UE is changed due to UE mobility (for example), the control circuitry 500 running the old VNF component may send the physical address of the new VNF component serving the UE to the router arrangement.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 4 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 4 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 4 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation may be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it may be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 4 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but may be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept may be implemented in various ways. Further, it is clear to a person skilled in the art that the described embodiments may, but are not required to, be combined with other embodiments in various ways.

The invention claimed is:

1. A method comprising:
implementing core network and radio access network parts of a mobile communication network utilizing a single layer of virtualized network function (VNF) components, where a given VNF component is designated to serve a user equipment;
routing at least part of traffic directed to the user equipment through a routing arrangement comprising a set of routers to the VNF component serving the user equipment; and
when the VNF component serving the user equipment is changed, updating the routing arrangement with the change.

2. The method of claim 1, further comprising:
when the VNF component serving the user equipment is changed from a first VNF component to a second VNF component, updating the routing arrangement to indicate the change from the first VNF component to the second VNF component.

3. The method of claim 1, wherein routing the at least part of the traffic directed to the user equipment comprises routing the at least part of the traffic directed to the user equipment from Internet and public switched telephone network through the routing arrangement.

4. The method of claim 1, wherein routing the at least part of the traffic directed to the user equipment comprises routing control plane traffic directed to the user equipment through the routing arrangement.

5. The method of claim 1, wherein routing the at least part of the traffic directed to the user equipment comprises routing user plane traffic directed to the user equipment through the routing arrangement.

6. The method of claim 1, wherein traffic directed to the user equipment comprises a logical address, and wherein the routing arrangement maps the logical address to a physical address of the VNF component serving the user equipment.

7. The method of claim 1, further comprising:
implementing the routing arrangement with two layers of routers, the first layer of routers directing traffic to a given second layer router based on a given hash algorithm of the address of the traffic, and the second layer router routing the traffic to a given VNF component.

8. The method of claim 7, further comprising:
when the VNF component serving the user equipment is changed from a first VNF component to a second VNF component, updating the second layer routers handling traffic of the user equipment with the change by the first VNF component.

9. A method in a mobile communication network infrastructure, the method comprising:
receiving traffic directed to a user equipment with a first layer router, the traffic comprising a logical address;
determining by the first layer router a second layer router based on a given hash algorithm of the logical address of the traffic;
routing by the first layer router the traffic to the determined second layer router;
mapping by the second layer router the logical address to a physical address of a virtualized network function (VNF) component serving the user equipment; and
routing by the second layer router the traffic to the VNF component.

10. An apparatus in a mobile communication network, the apparatus comprising:
at least one processor; and
at least one memory comprising a computer program code;
wherein the at least one memory and the computer program code are configured to, with the at least one processor, cause the apparatus to perform:
implementing core network and radio access network parts of the mobile communication network utilizing a single layer of virtualized network function (VNF) components, wherein a VNF component is designated to serve a user equipment;
routing at least part of traffic directed to the user equipment through a routing arrangement comprising a set of routers to the VNF component serving the user equipment; and
when the VNF component serving the user equipment is changed, updating the routing arrangement with the change.

11. The apparatus of claim 10, wherein the at least one memory and the computer program code are configured to, with the at least one processor, cause the apparatus further to perform:
routing traffic directed to given user equipment from Internet and public switched telephone network through the routing arrangement.

12. The apparatus of claim 10, wherein the at least one memory and the computer program code are configured to, with the at least one processor, cause the apparatus further to perform:
routing control plane traffic directed to the user equipment through the routing arrangement.

13. The apparatus of claim 10, wherein the at least one memory and the computer program code are configured to, with the at least one processor, cause the apparatus further to perform:
routing user plane traffic directed to the user equipment through the routing arrangement.

14. The apparatus of claim 10, wherein traffic directed to the user equipment comprises a logical address, wherein the at least one memory and the computer program code are configured to, with the at least one processor, cause the apparatus further to perform:
mapping the logical address to a physical address of the VNF component serving the user equipment.

* * * * *